United States Patent
Kusumoto et al.

(10) Patent No.: US 6,609,992 B2
(45) Date of Patent: Aug. 26, 2003

(54) AUTOMOTIVE ALTERNATOR

(75) Inventors: Katsuhiko Kusumoto, Tokyo (JP);
Tatsuhiko Mizutani, Tokyo (JP);
Yoshinobu Utsumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/939,791

(22) Filed: Aug. 28, 2001

(65) Prior Publication Data
US 2002/0049112 A1 Apr. 25, 2002

(30) Foreign Application Priority Data
Aug. 28, 2000 (JP) .......................... 2000-257110

(51) Int. Cl.[7] .............. F16H 3/44; F16H 3/72; F16H 37/06
(52) U.S. Cl. ............ 475/318; 475/8; 475/154; 290/46
(58) Field of Search .............. 475/4, 5, 8, 153, 475/154, 156, 318, 900; 310/76, 78, 94, 99, 103; 290/1 C, 15, 17, 39, 40 C, 51, 49, 46

(56) References Cited

U.S. PATENT DOCUMENTS

| 2,327,769 A | * | 8/1943 | Claytor | 475/318 |
| 2,998,539 A | * | 9/1961 | Bessiere | 475/318 |
| 5,118,960 A | * | 6/1992 | Sasamoto et al. | 29/38 C |
| 5,378,210 A | * | 1/1995 | Teraoka | 475/312 |
| 5,842,944 A | * | 12/1998 | Morishita et al. | 475/154 |
| 6,008,545 A | * | 12/1999 | Nagano et al. | 290/1 C |
| 6,083,130 A | * | 7/2000 | Mevissen et al. | 192/107 T |
| 6,234,769 B1 | * | 5/2001 | Sakai et al. | 417/374 |
| 6,425,838 B1 | * | 7/2002 | Matsubara et al. | 475/13 |

FOREIGN PATENT DOCUMENTS

| EP | 0301704 | * | 2/1989 | F16H/3/56 |
| JP | Hei 9-172753 | | 6/1997 | H02K/7/108 |

* cited by examiner

Primary Examiner—Sherry Estremsky
Assistant Examiner—Tisha D. Lewis
(74) Attorney, Agent, or Firm—Sughrue Mion, PLLC

(57) ABSTRACT

An automotive alternator includes: a stator core 1 having a stator winding 2; front and rear brackets 3 and 4 holding the stator core 1; a rotor core 5 attached to a rotation shaft 7 rotatably mounted on the brackets; a one-way clutch 13 having a driving member 16 and a driven member 14, the driven member 14 fixed to the rotation shaft 7; an overdrive planetary gear mechanism 17 having a sun gear 22, a planet gear 21, and an outer ring gear 24, the sun gear 22 fixed to the rotation shaft, the planet gear 21 attached to the driving member 16, the outer ring gear 24 rotatably supported; an input shaft 19 to which an end of the support shaft 20 of the planet gear 21 is fixed; and an electromagnetic brake 26 blocking rotation of the outer ring gear 24 by energization.

16 Claims, 13 Drawing Sheets

AUTOMOTIVE ALTERNATOR

BACKGROUND OF THE INVENTION

1. Field of the Invention

The present invention relates to an automotive alternator which is to be mounted on a vehicle, and driven by an internal combustion engine to supply electric power to loads and charge a battery.

2. Description of the Related Art

FIG. 12 is a section view showing the configuration of a usual conventional automotive alternator, and FIG. 13 is an output characteristic diagram of the automotive alternator. Referring to FIG. 12, 1 denotes a stator core which is formed into a cylindrical shape, and which has a poly-phase stator winding 2, 3 and 4 denote front and rear brackets which hold the stator core 1, 5 denotes a claw-pole type rotor core which is disposed within the inner diameter of the stator core 1 with forming an air gap therebetween, which has a field winding 6, and which is fixed to a rotation shaft 7; 8a and 8b denote bearings which are disposed respectively on the front and rear brackets 3 and 4 to rotatably support the rotation shaft 7, 9 denotes a pulley which is disposed on one end of the rotation shaft 7 on the side of the front bracket 3, and which is driven by an internal combustion engine (not shown), 10 denotes a slip ring which is fixed to the rotation shaft 7 to supply a field current to the field winding 6, and 11 denotes a brush holder which is attached to the rear bracket 4, and which has brushes 12 that are in sliding contact with the slip ring 10.

In the thus configured conventional automotive alternator, the field current is supplied to the field winding 6 via the brushes 12 and the slip ring 10, and the pulley 9 is driven by the internal combustion engine which is not shown. Then, AC power is generated in the poly-phase stator winding 2. The AC power is rectified by a full-wave rectifier which is incorporated into the alternator, and which is not shown, and then used for charging a battery mounted on a vehicle and supplied to loads. A voltage control device which is not shown is incorporated into the alternator. The voltage control device turns on and off the field current to hold the output voltage to a predetermined value. The alternator has characteristics in which, in the case where the terminal voltage is held to the predetermined value, for example, 14 V, as shown in FIG. 13, the output voltage rises when the generated voltage exceeds a predetermined voltage, and is increased as the rotational speed is made higher, to be saturated in the high speed range.

On the other hand, such an automotive alternator is requested to have output characteristics in which, even in the low speed range of an internal combustion engine, i.e., the idling range, the output is sufficient for supplying electric power to loads and charging a battery. In order to increase the output current in such a low speed range, it may be first contemplated to increase the size, particularly, the outer diameter of the alternator, or the pulley ratio with respect to the engine so as to make the rotational speed higher. However, an automotive alternator which is to be mounted in an engine compartment of a vehicle must be miniaturized and lightened. Therefore, it is very difficult to increase the size. In the case where the alternator is driven by means of a poly-V belt or the like, for example, the increase of the pulley ratio causes belt slip. In order to suppress such belt slip, the diameter of a pulley on the side of the crankshaft of the engine must be increased. In accordance with this increase, also the diameters of pulleys for various belt-driven auxiliary devices must be increased, thereby causing the internal combustion engine to be enlarged.

SUMMARY OF THE INVENTION

The invention has been conducted in order to solve this problem. It is an object of the invention to provide an automotive alternator in which the output current in, particularly, the low rotational speed range including the idling range of an internal combustion engine can be increased without enlarging the outer diameter of the alternator, and the mechanical reliability is not impaired by the increase.

To achieve the above object, the automotive alternator of the invention comprises: a stator core having a stator winding; front and rear brackets which hold the stator core from both sides; a rotor core which is attached to a rotation shaft that is rotatably mounted on the brackets, and which has a field winding; a one-way clutch which has a driving member and a driven member, the driven member being fixed to the rotation shaft; an overdrive planetary gear mechanism which has a sun gear, a planet gear, and an outer ring gear, the sun gear being fixed to the rotation shaft, one end of a support shaft of the planet gear being fixed to the driving member of the one-way clutch, the outer ring gear being rotatably supported; an input shaft to which another end of the support shaft of the planet gear of the overdrive planetary gear mechanism is fixed, and which receives a driving force from an internal combustion engine; and an electromagnetic brake which operates in response to energization to block rotation of the outer ring gear of the overdrive planetary gear mechanism.

Moreover, the alternator has a housing which is attached to the front bracket, and which covers an axial end portion of the rotation shaft, one end of the input shaft is supported by a bearing disposed on the housing, and another end of the input shaft is supported by the rotation shaft via the support shaft of the planet gear and the one-way clutch.

Furthermore, a bearing is disposed on an outer diameter of the driving member of the one-way clutch, one end of a cylindrical member having the outer ring gear of the overdrive planetary gear mechanism is supported by the bearing, and another end of the cylindrical member is supported by the bearing disposed on the housing.

Furthermore, the automotive alternator of the invention comprises: stator core having a stator winding; front and rear brackets which hold the stator core from both sides; a rotor core which is attached to a rotation shaft that is rotatably mounted on the brackets, and which has a field winding; an overdrive planetary gear mechanism which has a sun gear, a planet gear, and an outer ring gear, the sun gear being fixed to the rotation shaft, one end of a support shaft of the planet gear being fixed to the driving member of the one-way clutch, the outer ring gear being rotatably supported; an input shaft to which the support shaft of the planet gear of the overdrive planetary gear mechanism is fixed, and which receives a driving force from an internal combustion engine; a one-way clutch which has a driving member and a driven member, the driving member being fixed to the input shaft, the driven member being coupled with a member having the outer ring gear of the overdrive planetary gear mechanism; and an electromagnetic brake which operates in response to energization to block rotation of the outer ring gear of the overdrive planetary gear mechanism.

Moreover, the alternator has a housing which is attached to the front bracket, and which covers an axial end portion of the rotation shaft, one end of the input shaft is supported by a bearing disposed on the housing, via the one-way clutch, the alternator further has a support member which is elongated from another end of the input shaft, and the support member is supported by a bearing disposed on the front bracket.

Furthermore, the alternator has a housing which is attached to the front bracket, and which covers an axial end portion of the rotation shaft, one end of the input shaft is supported by a bearing disposed on the housing, via the one-way clutch, the alternator further has a support member which is elongated from another end of the input shaft, and the support member is supported by a bearing disposed on the rotation shaft.

Moreover, the automotive alternator of the invention comprises: a stator core having a stator winding; front and rear brackets which hold the stator core from both sides; a rotor core which is attached to a rotation shaft that is rotatably mounted on the brackets, and which has a field winding; a one-way clutch which has a driving member and a driven member, the driven member being fixed to the rotation shaft, the driving member being integrated with an input shaft driven by an internal combustion engine; an overdrive planetary gear mechanism which has a sun gear, a planet gear, and an outer ring gear, the sun gear being fixed to the rotation shaft, a support shaft of the planet gear being fixed to the driving member which is integrated with the input shaft, the outer ring gear being rotatably supported; and an electromagnetic brake which operates in response to energization to block rotation of the outer ring gear of the overdrive planetary gear mechanism.

Moreover, one end portion of a member having the outer ring gear is supported by the rotation shaft via a bearing, and another end of the member is supported via a bearing by an outer diameter of the driving member which is integrated with the input shaft.

Furthermore, the alternator has a housing which is attached to the front bracket, and which covers an axial end portion of the rotation shaft, and the driving member of the one-way clutch which is integrated with the input shaft is supported by a bearing disposed on the housing.

Moreover, the driving member of the one-way clutch is attached to the input shaft via an elastic member.

Furthermore, the input shaft which is driven by the internal combustion engine is configured to be separable from the driving member of the one-way clutch.

Moreover, the sun gear of the overdrive planetary gear mechanism which is fixed to the rotation shaft, and the driven member of the one-way clutch are integrally formed.

Furthermore, the sun gear of the overdrive planetary gear mechanism which is fixed to the rotation shaft, and the driven member of the one-way clutch are separably formed.

Moreover, bearings which rotatably support a member having the outer ring gear are disposed respectively in two places in an axial direction, and at least one of the bearings bears radial and axial loads.

Furthermore, the electromagnetic brake has: an exciting coil which magnetizes a magnetic path; and a moving element which is attracted by magnetization of the magnetic path to block rotation of the outer ring gear of the overdrive planetary gear mechanism, the electromagnetic brake is accommodated in the housing, and guide grooves which mutually engage with each other are formed in an inner face of the housing, and an outer face of the moving element.

Moreover, the member having the outer ring gear is formed into a U-like section shape having a bottom face and two side faces, the bottom face is a face abutting against the moving element of the electromagnetic brake, the two side faces surround inner and outer peripheries of the electromagnetic brake, and a gap between inner faces of the two side faces and an outer face of the magnetic path is larger as moving toward an opening of the U-like section shape.

DETAILED DESCRIPTION OF THE PREFERRED EMBODIMENTS

Now, a description will be given in more detail of embodiments of the invention with reference to the accompanying drawings.

Embodiment 1

Figure 1:
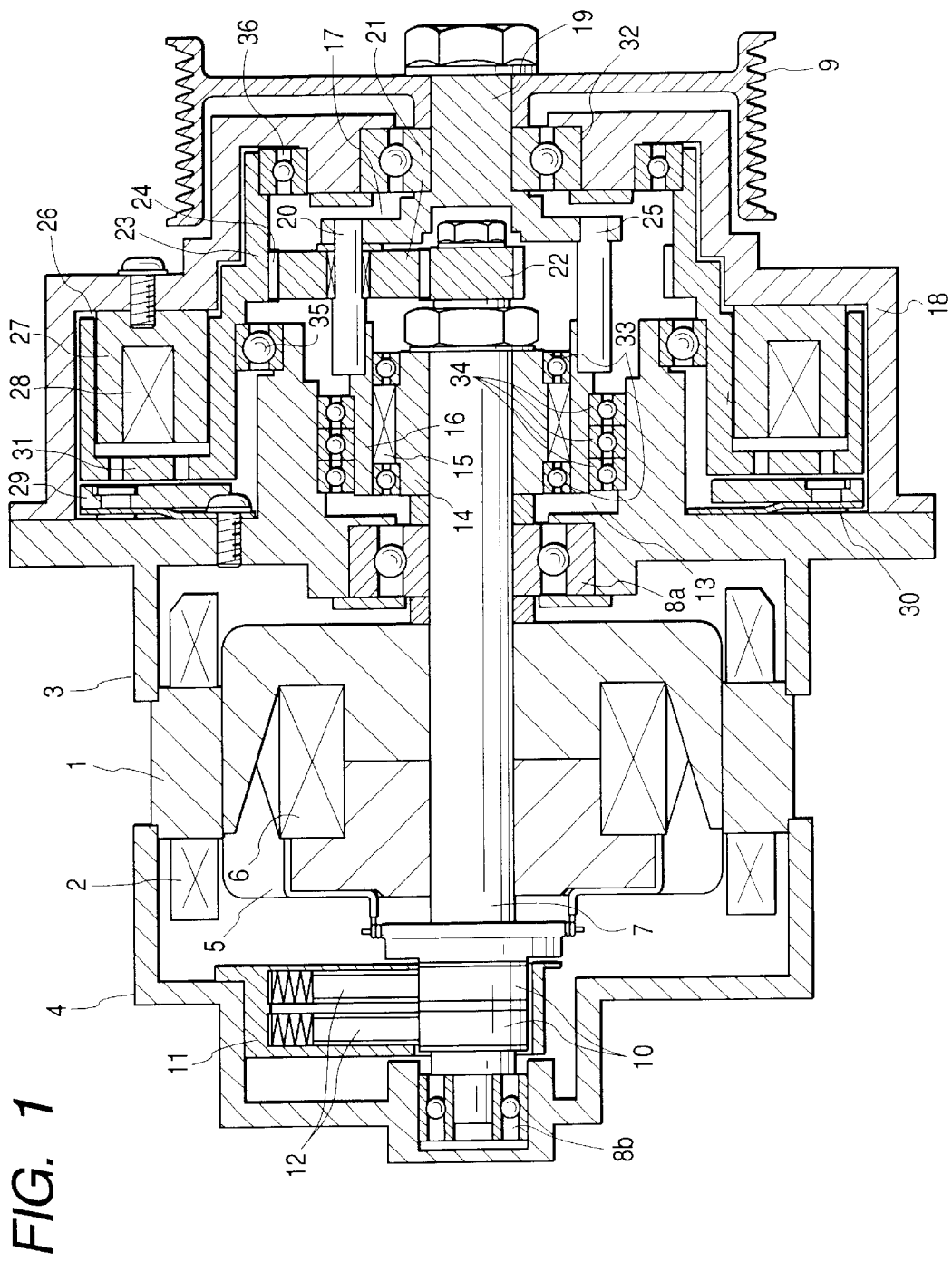
FIG. 1 is a section view of an automotive alternator of Embodiment 1 of the invention.
Figure 2:
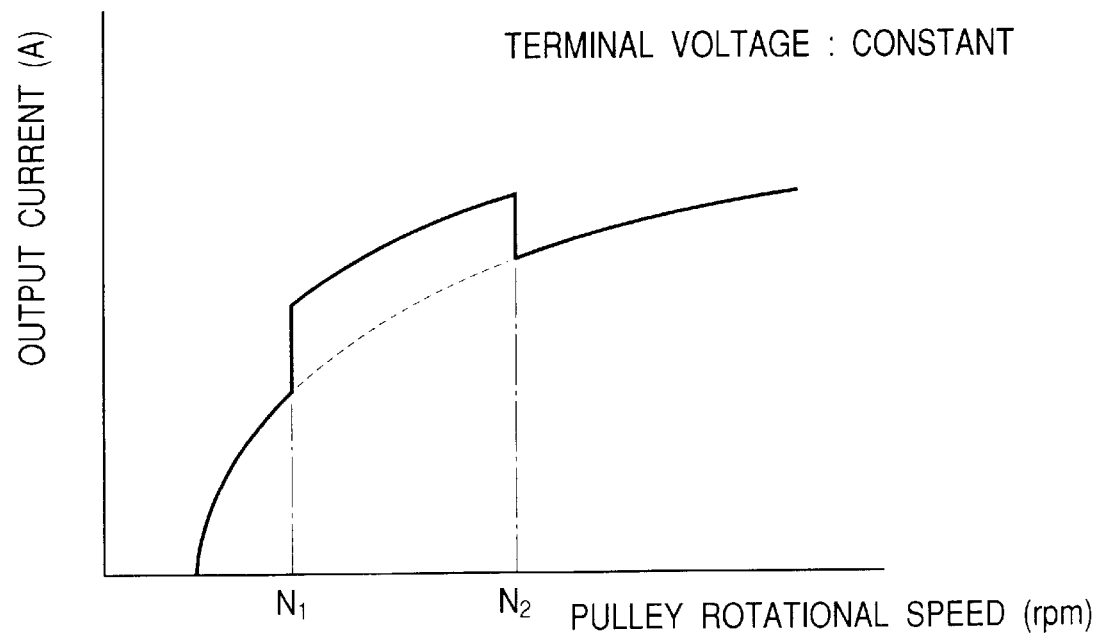
FIG. 2 is an output characteristic diagram of the automotive alternator of Embodiment 1 of the invention.

FIG. 1 is a section view of an automotive alternator of Embodiment 1 of the invention, and FIG. 2 shows output characteristics of the automotive alternator. Referring to FIG. 1, 1 denotes a stator core which is formed into a cylindrical shape, and which has a poly-phase stator winding 2, 3 and 4 denote front and rear brackets which hold the stator core 1 from both the sides, 5 denotes a claw-pole type rotor core which is disposed within the inner diameter of the stator core 1 with forming an air gap therebetween, which has a field winding 6, and which is fixed to a rotation shaft 7; 8a and 8b denote bearings which are disposed respectively on the front and rear brackets 3 and 4 to rotatably support the rotation shaft 7, 10 denotes a slip ring which is fixed to the rotation shaft 7 to supply a field current to the field winding 6, and 11 denotes a brush holder which is attached to the rear bracket 4, and which has brushes 12 that are in sliding contact with the slip ring 10.

The reference numeral 13 denotes an one-way clutch which has a driven member 14 attached to the rotation shaft 7, a torque transmitting member 15, and a driving member 16, 19 denotes an input shaft which is rotatably supported by a housing 18, and which at one end has a pulley 9 driven by an internal combustion engine (not shown), and 17 denotes an overdrive planetary gear mechanism having: a planet gear 21 which is attached to the input shaft 19 through a support shaft 20; a sun gear 22 which is disposed on one end of the rotation shaft 7; and an outer ring gear 24 which is disposed on the inner face of a cylindrical member 23 that is rotatably disposed. The support shaft 20 of the overdrive planetary gear mechanism 17 is coupled and fixed also to the driving member 16 of the one-way clutch 13. A holding member 25 is disposed on the input shaft 19 and coupled to the driving member 16 of the one-way clutch 13, so that one end of the input shaft 19 is supported by the driving member 16 via the support shaft 20 and the holding member 25. The planet gear 21 is held between the driving member 16 and the input shaft 19.

The reference numeral 26 denotes an electromagnetic brake which has a magnetic path 27, an exciting coil 28, and a moving element 29. The cylindrical member 23 which has the outer ring gear 24 of the overdrive planetary gear mechanism 17 is elongated so as to be interposed between the magnetic path 27 and the moving element 29. In the periphery of the electromagnetic brake 26, the cylindrical member 23 is further elongated into a U-like shape so as to surround the inner and outer peripheries of the magnetic path 27. The moving element 29 is attached to the front bracket 3 via a spring 30, and attracted toward the magnetic path 27 against the elasticity of the spring 30 in response to energization of the exciting coil 28, to be sucked to a brake surface 31 of the cylindrical member 23, thereby blocking rotation of the member. The reference numeral 32 denotes a bearing which is disposed on the housing 18 to rotatably support one end portion of the input shaft 19, 33 and 34 denote bearings which rotatably support the driving member 16 of the one-way clutch 13 with respect to the driven member 14 and the front bracket 3, and 35 and 36 denote bearings which rotatably support the cylindrical member 23 of the overdrive planetary gear mechanism 17 with respect to the housing 18 and the front bracket 3.

In the thus configured automotive alternator of Embodiment 1 of the invention, when the pulley 9 is driven by the internal combustion engine (not shown), the rotational torque is transmitted from the pulley 9 to the planet gear 21 via the input shaft 19 and the support shaft 20. Under the state where the electromagnetic brake 26 does not operate and the cylindrical member 23 is rotatable, the overdrive planetary gear mechanism 17 does not operate so that the torque is transmitted from the input shaft 19 to the driving member 16 of the one-way clutch 13 via the support shaft 20 and the holding member 25, and then to the rotation shaft 7 via the torque transmitting member 15 and the driven member 14, thereby causing the rotation shaft 7 and the rotor core 5 fixed thereto to be rotated at the same rotational speed as the pulley 9.

When the exciting coil 28 of the electromagnetic brake 26 is energized, magnetic fluxes are generated in the magnetic path 27 and the moving element 29, and the moving element 29 is attracted against the pressing force of the spring 30, to be sucked to the cylindrical member 23, whereby rotation of the member is blocked and the outer ring gear 24 disposed on the inner face of the cylindrical member 23 is fixed. Consequently, transmission of rotation is conducted between the planet gear 21 and the sun gear 22 disposed in one end of the rotation shaft 7, so that the rotation shaft 7 is overdriven in accordance with the gear ratio of the outer ring gear 24 and the sun gear 22. At this time, the torque transmitting member 15 is in a free state, and hence transmission of rotation is not conducted between the driving member 16 of the one-way clutch 13 coupled with the input shaft 19 and the support shaft 20, and the driven member 14. As a result, the rotation shaft 7 and the rotator core 5 fixed thereto are rotated with being overdriven by a degree corresponding to the speed-increasing ratio of the overdrive planetary gear mechanism 17 with respect to the pulley 9.

As shown in FIG. 2, when the rotational speed of the pulley 9 is N1, the electromagnetic brake 26 is turned on, and, when the rotational speed is N2, the electromagnetic brake is turned off. In this case, when the rotational speed of the pulley is between N1 and N2, the rotational speed of the rotation shaft 7 is increased, so that the output current can be increased as shown in the figure. When the electromagnetic brake 26 is turned off in the high speed range, the output in the low speed range in which the output is usually required to be increased can be attained by increasing the number of revolutions of the alternator.

Since the one end of the input shaft 19 is supported by the bearing 32 and the other end is coupled to the driving member 16 of the one-way clutch 13 via the support shaft 20 and the holding member 25, the other end is supported by the bearing 34, and the rigidity of the input shaft 19 can be enhanced, so that it is possible to prevent an offset load from being applied to various portions of the overdrive planetary gear mechanism 17. Therefore, an overdrive mechanism of high reliability can be obtained.

When an angular contact bearing is used as one of the bearings 35 and 36 supporting the cylindrical member 23 of the overdrive planetary gear mechanism 17, it is possible to receive stress in the thrust direction which is applied to the cylindrical member 23 during operation of the electromagnetic brake 26. When the gap between the magnetic path 27 and the cylindrical member 23 which is elongated into a U-like shape so as to surround the magnetic path 27 is made larger as moving toward the opening of the U-like shape of the cylindrical member 23, mutual interference due to tilting of the cylindrical member 23 can be prevented from occurring.

Embodiment 2

Figure 3:
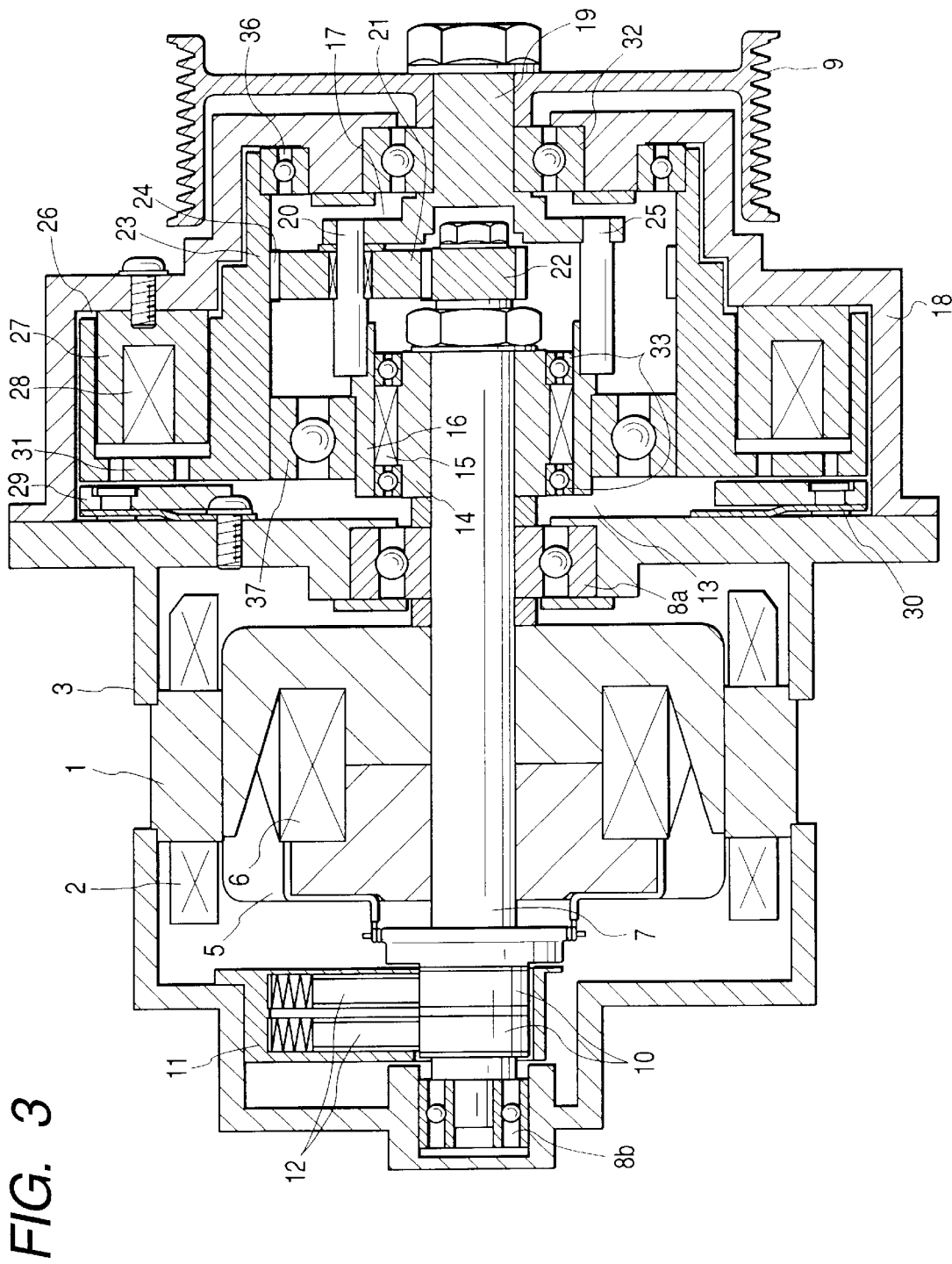
FIG. 3 is a section view of an automotive alternator of Embodiment 2 of the invention.

FIG. 3 is a section view of an automotive alternator of Embodiment 2 of the invention. The automotive alternator of the embodiment is configured by modifying the automotive alternator of Embodiment 1 in the following manner. A bearing 37 is disposed between the outer diameter of the driving member 16 of the one-way clutch 13 and the cylindrical member 23 having the outer ring gear 24 of the overdrive planetary gear mechanism 17, thereby allowing one end portion of the outer ring gear 24 of the overdrive planetary gear mechanism 17 to be supported by the rotation shaft 7 via the one-way clutch 13. According to this configuration, the bearing supporting the one-way clutch 13 can be used also as the bearing supporting the outer ring gear 24, and hence the number of parts can be reduced.

Embodiment 3

Figure 4:
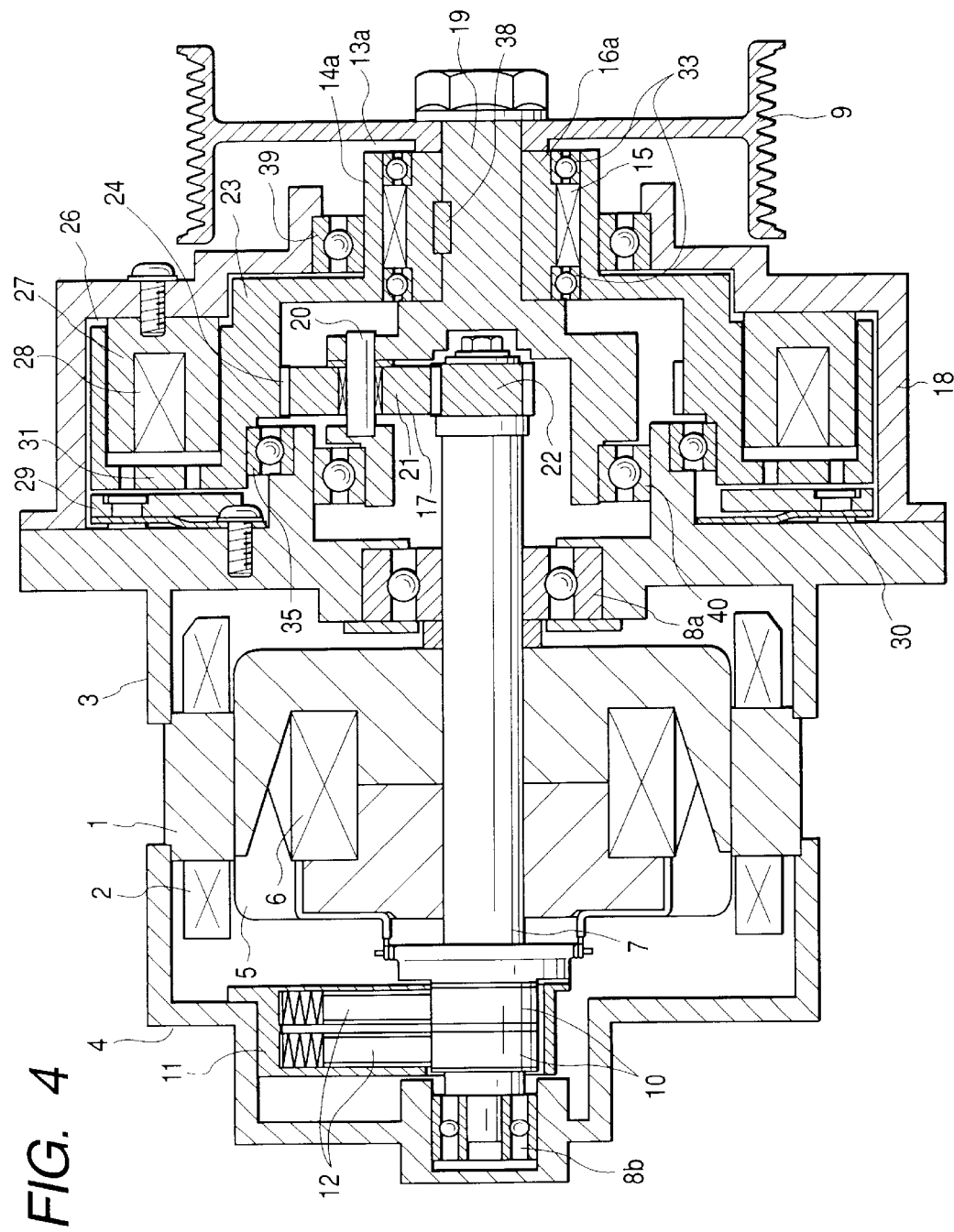
FIG. 4 is a section view of an automotive alternator of Embodiment 3 of the invention.

FIG. 4 is a section view of an automotive alternator of Embodiment 3 of the invention. The automotive alternator of the embodiment is configured by modifying the automotive alternator of Embodiment 1 in the following manner. A one-way clutch 13a having a driven member 14a, the torque transmitting member 15, and a driving member 16a is attached to the outer periphery of the input shaft 19, and the driven member 14a is configured integrally with the cylindrical member 23 having the outer ring gear 24 of the overdrive planetary gear mechanism 17. The driving member 16a is fixed to the input shaft 19 through fixing means such as a key 38, a bearing 39 is disposed between the outer diameter of the driven member 14a and the housing 18 to support the one end of the input shaft 19, and the other end of the input shaft 19 is supported by the front bracket 3 via a bearing 40. In the same manner as Embodiment 1, the sun gear 22 of the overdrive planetary gear mechanism 17 is fixed to the rotation shaft 7, and the support shaft 20 of the planet gear 21 is fixed to the input shaft 19.

In the thus configured automotive alternator of Embodiment 3 of the invention, under the state where the electromagnetic brake 26 does not operate, the outer ring gear 24 is driven by the planet gear 21 at an angular velocity which is higher than that of the support shaft 20. Because of the coupling with the one-way clutch 13a, the outer ring gear is enabled to be rotated only at the same rotational speed as the input shaft 19. Therefore, the overdrive planetary gear mechanism 17 becomes stationary, and the rotation shaft 7 is rotated at the same rotational speed as that of the pulley 9. When the exciting coil 28 of the electromagnetic brake 26 is energized, magnetic fluxes are generated in the magnetic path 27 and the moving element 29, and the moving element 29 is attracted against the pressing force of the spring 30, to be sucked to the cylindrical member 23, whereby rotation of the outer ring gear 24 is blocked and the one-way clutch 13 is made free in the direction along which rotation of the outer ring gear 24 is blocked. In the same manner as Embodiment 1, therefore, the rotation shaft 7 and the rotator core 5 fixed thereto are rotated with being overdriven by a degree corresponding to the speed-increasing ratio of the overdrive planetary gear mechanism 17 with respect to the pulley 9. Consequently, also the embodiment can attain the same effects as those of Embodiment 1. As seen from the configuration shown in the figure, the number of parts of the bearings can be reduced.

Embodiment 4

Figure 5:
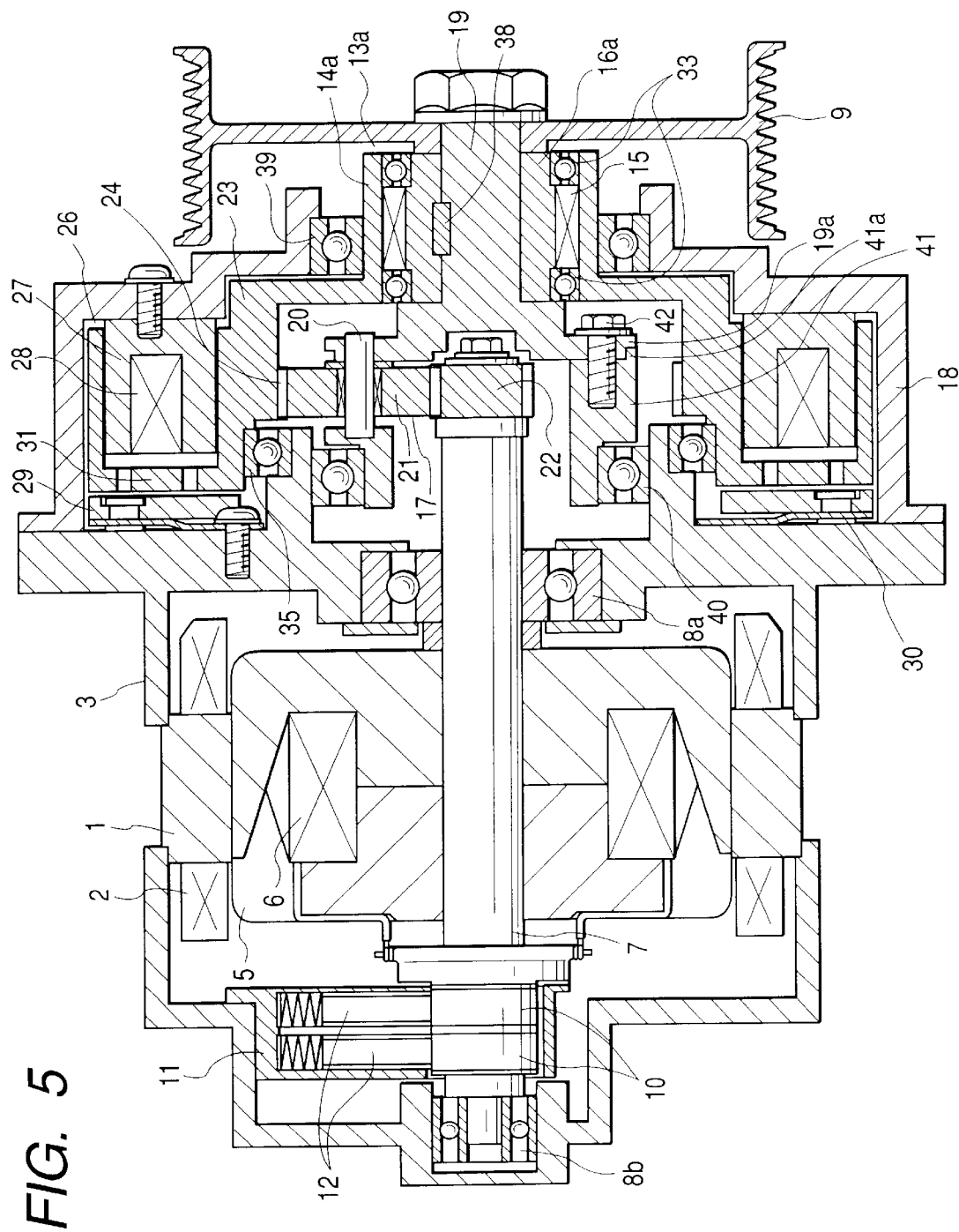
FIG. 5 is a section view of an automotive alternator of Embodiment 4 of the invention.

FIG. 5 is a section view of an automotive alternator of Embodiment 4 of the invention. The automotive alternator of the embodiment is configured by modifying the automotive alternator of Embodiment 3 in the following manner. A socket 19a is disposed in a large diameter portion of the input shaft 19, and a support member 41 having a spigot 41a is fitted to the bearing 40 attached to the front bracket 3. The socket 19a of the input shaft 19, and the spigot 41a of the support member 41 are fitted to each other and then fixed by a screw 42, so that the support member 41 is configured as an elongated portion of the input shaft 19, thereby allowing both the ends of the input shaft 19 to be supported by the bearings 39 and 40. According to this configuration, the rigidity of the input shaft 19 is ensured, and assembly can be performed in the procedure wherein the support member 41 is mounted onto the front bracket 3 and the planet gear 21 and the input shaft 19 are then attached to the support member 41. Therefore, the assembling property can be improved.

Embodiment 5

Figure 6:
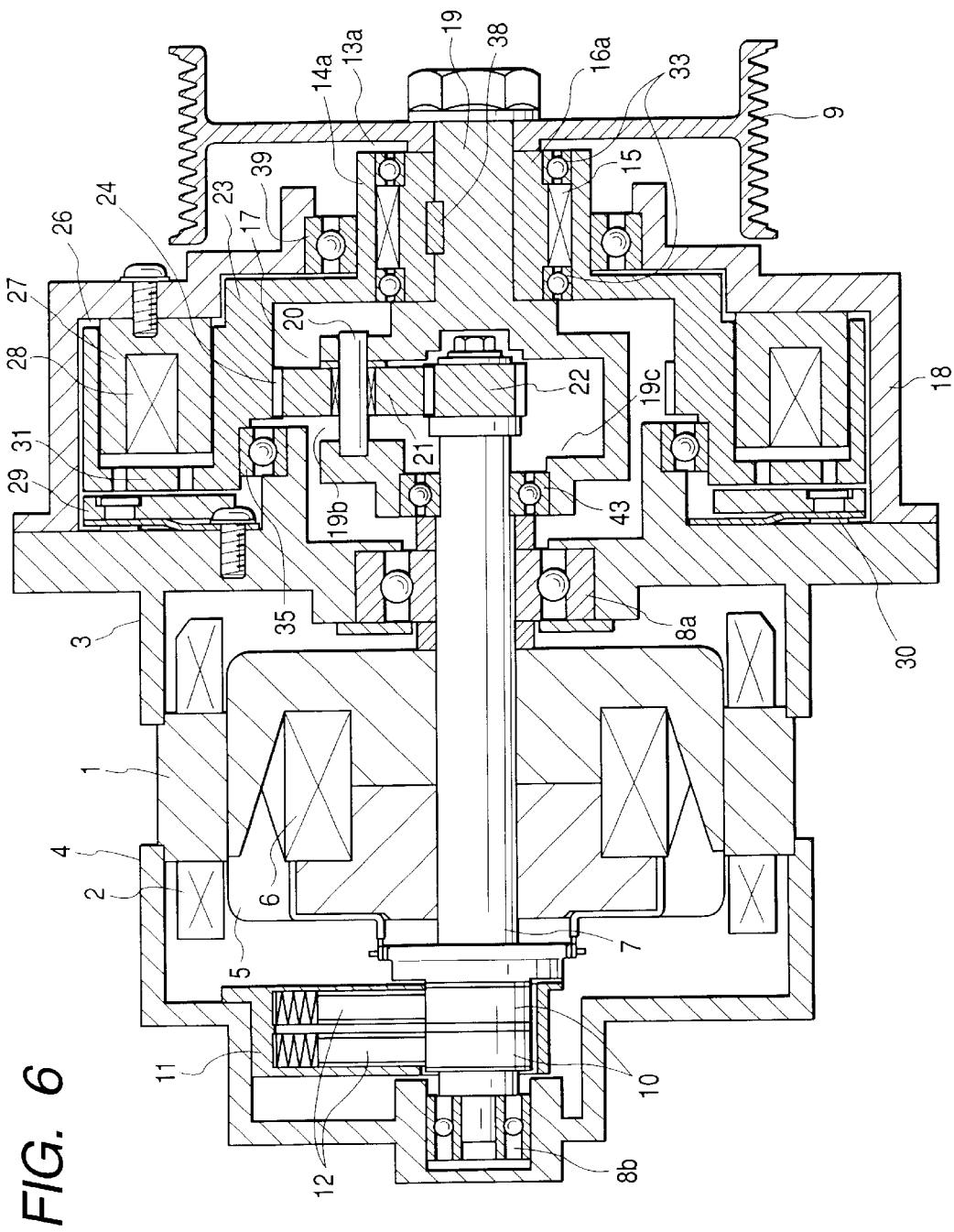
FIG. 6 is a section view of an automotive alternator of Embodiment 5 of the invention.

FIG. 6 is a section view of an automotive alternator of Embodiment 5 of the invention. The automotive alternator of the embodiment is configured by modifying the automotive alternator of Embodiment 3 in the following manner. A box-like part 19c which has an opening 19b in a radial direction is disposed in the end portion of the input shaft 19 opposite to the side having the pulley 9. The one end portion of the input shaft 19 is supported by the rotation shaft 7 via the tip end of the box-like part 19c and a bearing 43. The planet gear 21 is attached to a portion corresponding to the opening 19b. According to this configuration, the rigidity of the input shaft 19 is improved. Therefore, partial wear of the gears of the overdrive planetary gear mechanism 17 can be reduced, and the diameter of the bearing 43 itself can be reduced.

Embodiment 6

Figure 7:
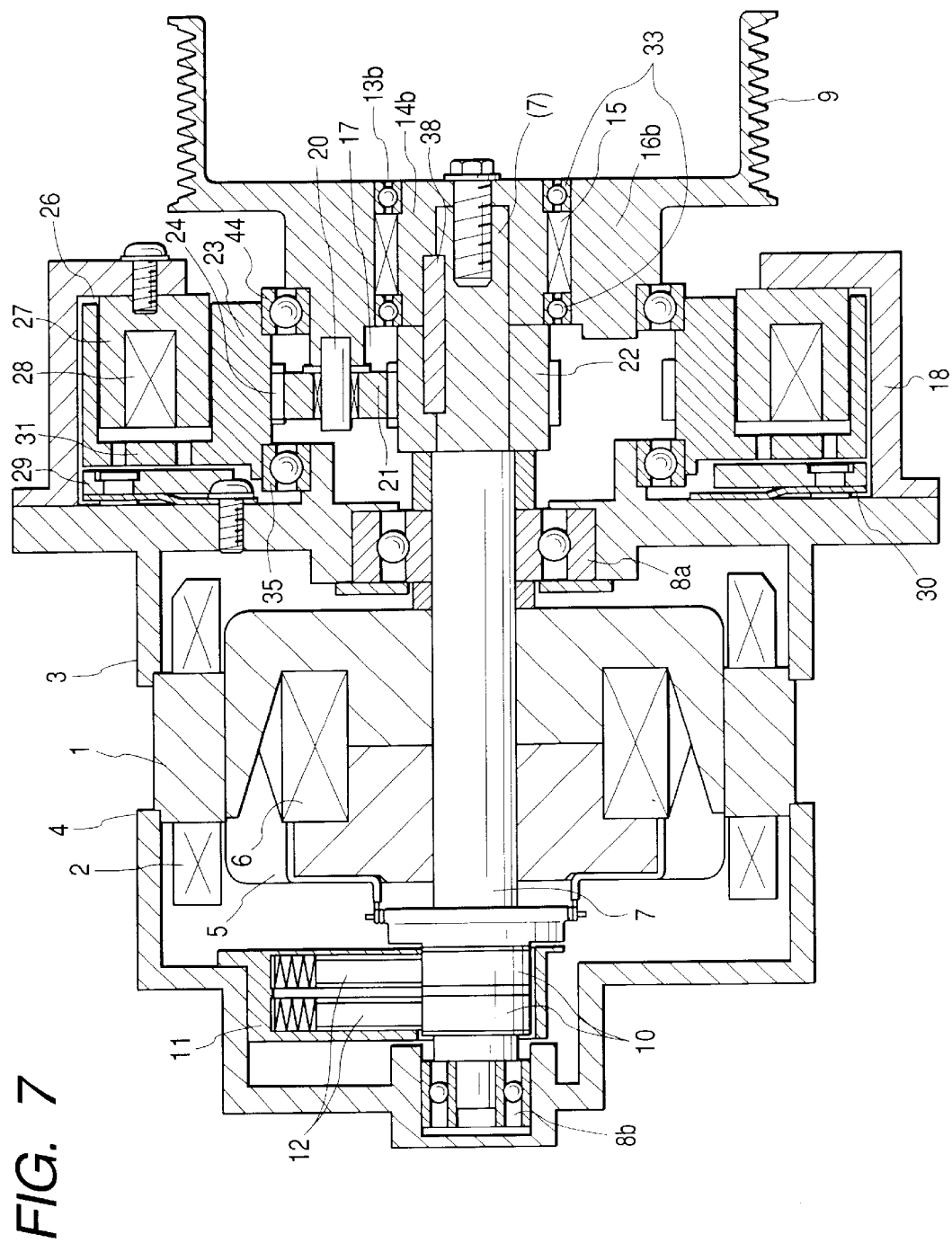
FIG. 7 is a section view of an automotive alternator of Embodiment 6 of the invention.

FIG. 7 is a section view of an automotive alternator of Embodiment 6 of the invention. The automotive alternator of the embodiment is configured by modifying the automotive alternator of Embodiment 1 in the following manner. The pulley 9 which is driven by an internal combustion engine (not shown) is configured integrally with a driving member 16b of a one-way clutch 13b which serves also as the input shaft, and attached to the one end portion of the rotation shaft 7 via the torque transmitting member 15 and a driven member 14b. The planet gear 21 of the overdrive planetary gear mechanism 17 is attached to the driving member 16b by means of the support shaft 20. The sun gear 22 of the overdrive planetary gear mechanism 17 is disposed on the rotation shaft 7. The outer ring gear 24 is disposed on the cylindrical member 23 which is supported by the bearing 35 disposed on the front bracket 3, and a bearing 44 disposed on the outer diameter of the driving member 16b of the one-way clutch 13b. The brake surface 31 of the cylindrical member 23 is interposed between the magnetic path 27 and the moving element 29 of the electromagnetic brake 26.

According to this configuration, under the state where the electromagnetic brake 26 is turned off, rotation of the pulley 9 is transmitted from the driving member 16b to the driven member 14b via the torque transmitting member 15, and the rotation shaft 7 is rotated at the same rotational speed as the pulley 9. When the electromagnetic brake 26 is changed to the turned-on state, the cylindrical member 23 is fixed, the rotation shaft 7 is overdriven in accordance with the gear ratio of the sun gear 22 and the outer ring gear 24, and the relation between the driving member 16b and the driven member 14b of the one-way clutch 13b is set to be free. Therefore, the embodiment can attain the same effects as those of Embodiment 1. Since the pulley 9 is configured integrally with the driving member 16b of the one-way clutch 13b, moreover, the configurations of both the one-way clutch 13b and the overdrive planetary gear mechanism 17 can be simplified, and the number of parts of the bearings can be reduced.

In the embodiment described above, the pulley 9 and the driving member 16b of the one-way clutch 13b are integrally configured. Alternatively, they may be separately configured so that the driving member 16b can be first attached and the pulley can be then attached. In the alternative, the assembling property can be improved, and the interchangeability of pulleys of different diameters and the driving member 16b can be attained. When the sun gear 22 of the overdrive planetary gear mechanism 17 which is attached to the rotation shaft 7, and the driven member 14b of the one-way clutch 13b which is similarly attached to the rotation shaft 7 are integrally configured, the number of parts can be reduced. When they are separately configured, the assembling property can be improved.

Embodiment 7

Figure 8:
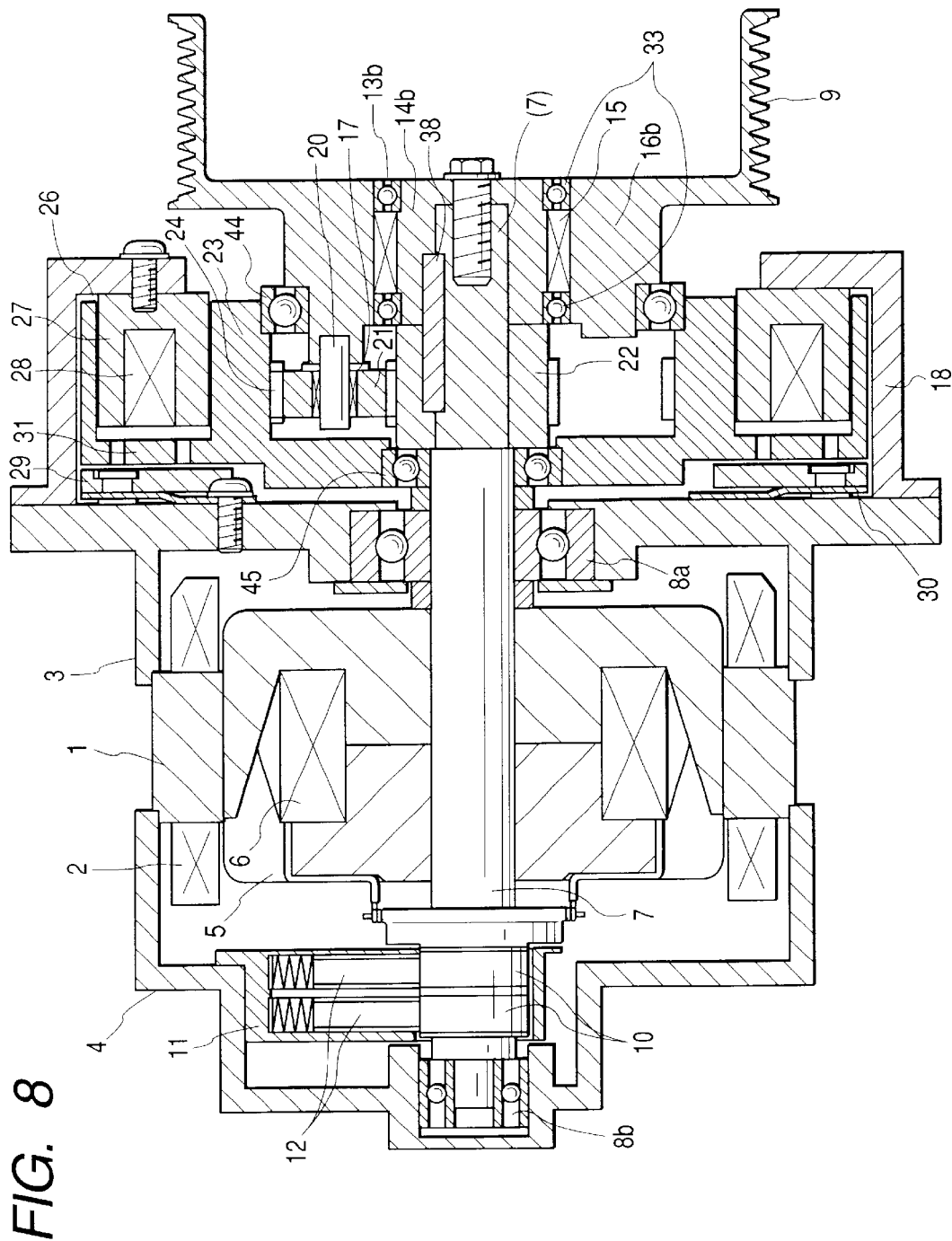
FIG. 8 is a section view of an automotive alternator of Embodiment 7 of the invention.

FIG. 8 is a section view of an automotive alternator of Embodiment 7 of the invention. The automotive alternator of the embodiment is configured by modifying the automotive alternator of Embodiment 6 in the following manner. The one end portion of the cylindrical member 23 having the outer ring gear 24 is supported by the rotation shaft 7 via a bearing 45, and the other end is supported by the outer diameter of the driving member 16b of the one-way clutch 13b via the bearing 44. According to this configuration, the eccentricity of the outer ring gear 24 with respect to the rotation shaft 7 is reduced, and also the rigidity of the cylindrical member 23 is attained, so that partial wear and damage of the gears of the overdrive planetary gear mechanism 17 can be reduced.

Embodiment 8

Figure 9:
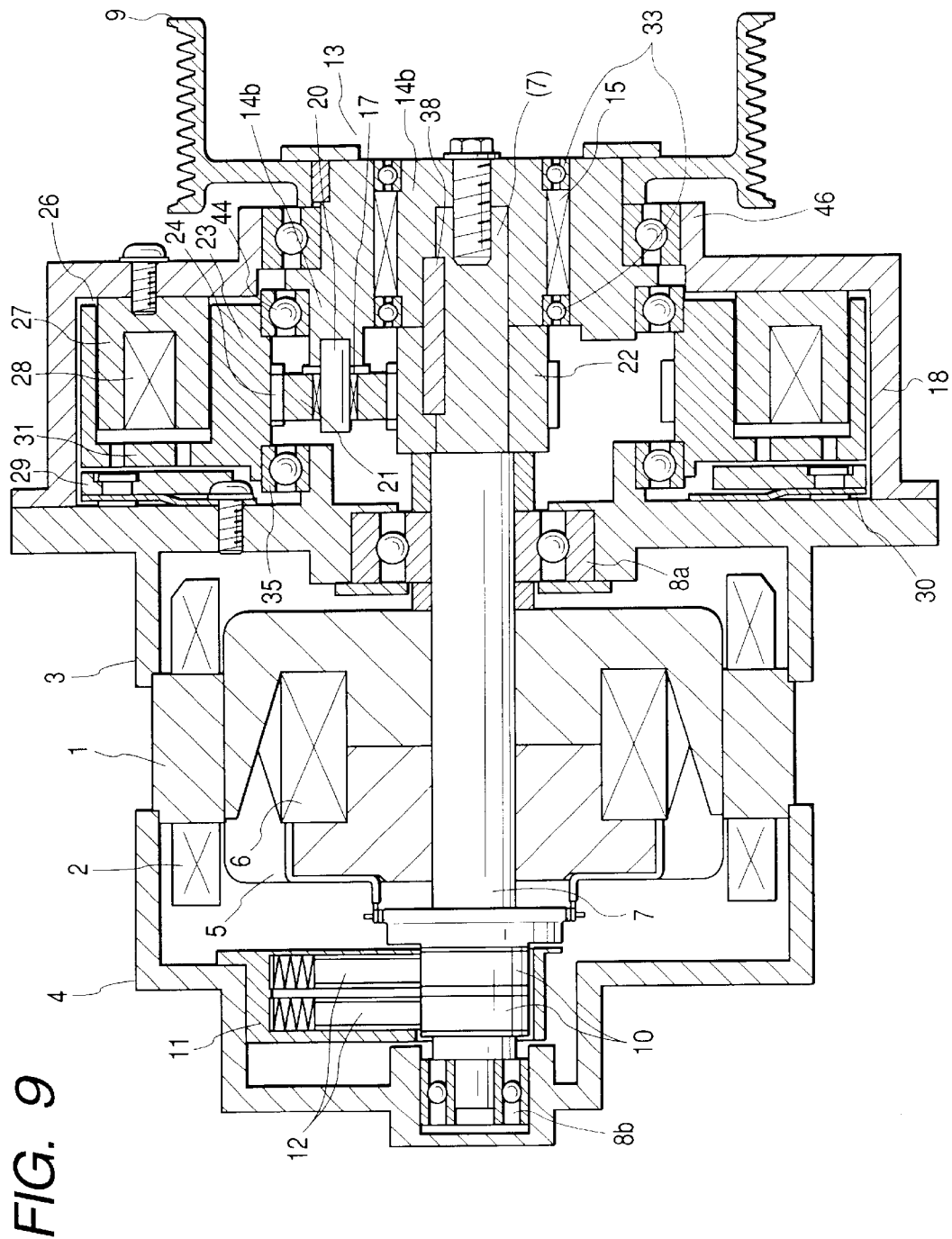
FIG. 9 is a section view of an automotive alternator of Embodiment 8 of the invention.

FIG. 9 is a section view of an automotive alternator of Embodiment 8 of the invention. The automotive alternator of the embodiment is configured by modifying the automotive alternator of Embodiment 6 in the following manner. The pulley 9 which is driven by an internal combustion engine (not shown) is configured integrally with the driving member 16b of the one-way clutch 13b which serves also as the input shaft, and the outer diameter of the integral is supported by a bearing 46 disposed on the housing 18. The pulley 9, and hence the driving member 16b serving also as the input shaft receives a large moment load due to tension of a belt which is not shown. In the case of Embodiment 6, since the pulley 9 is attached to the rotation shaft 7 and the rotation shaft 7 is supported by the bearing 8a, a large bending moment is applied to the rotation shaft. By contrast, in the embodiment, the driving member 16b is supported by the housing 18 via the bearing 46, and hence the housing 18 receives such a bending moment, so that the rigidity of the rotation shaft 7 is improved. As a result, partial wear and damage of the gears constituting the overdrive planetary gear mechanism 17 can be prevented from occurring.

Embodiment 9

Figure 10:
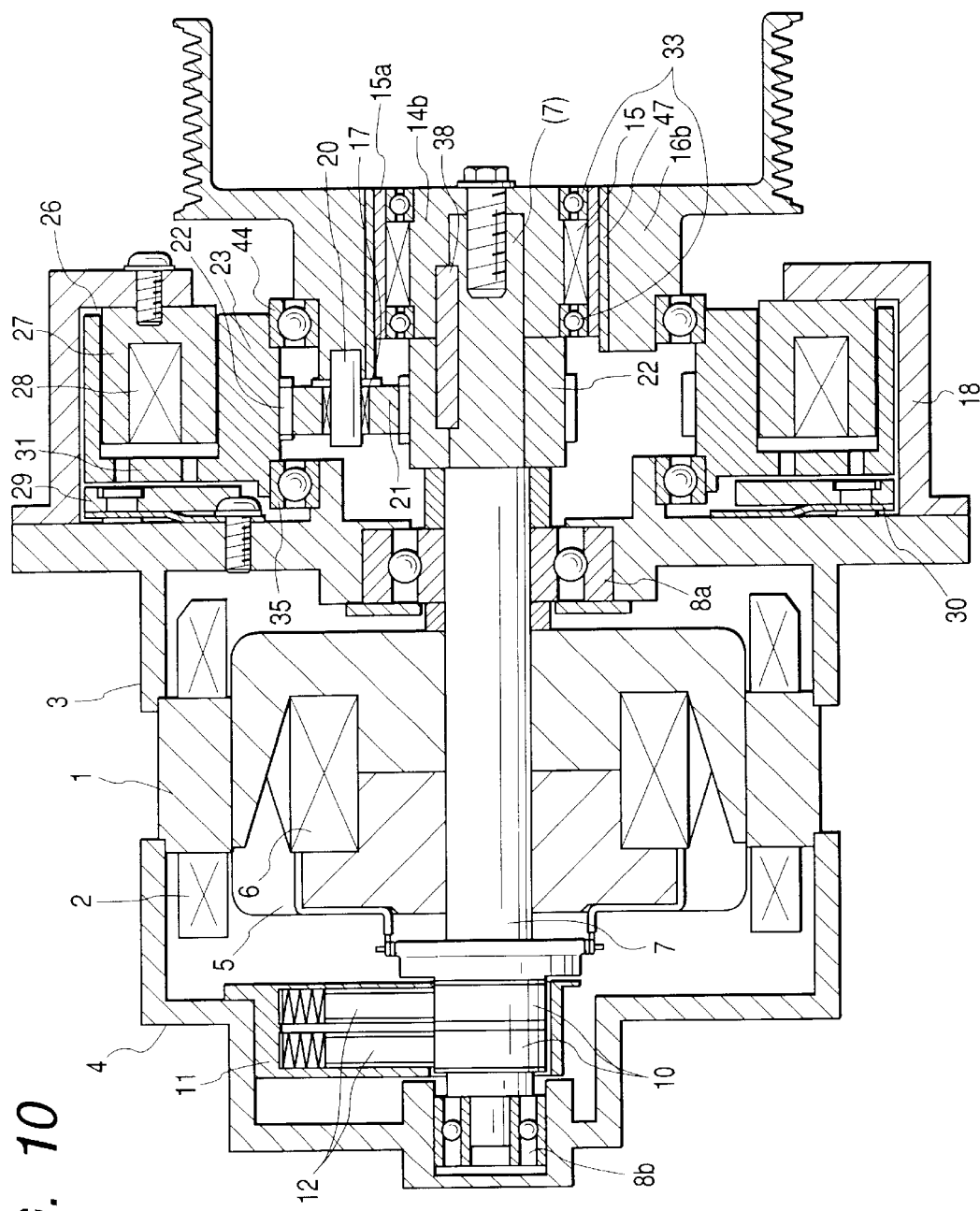
FIG. 10 is a section view of an automotive alternator of Embodiment 9 of the invention.

FIG. 10 is a section view of an automotive alternator of Embodiment 9 of the invention. The automotive alternator of the embodiment is configured by modifying the automotive alternator of Embodiment 6 in the following manner. An elastic member 47 such as a rubber damper is interposed between the driving member 16b of the one-way clutch 13b which is configured integrally with the pulley 9, and a member 15a engaged with the torque transmitting member 15 which transmits the power. A torque ripple due to torque variation of the internal combustion engine is applied to the pulley 9 which is driven by the internal combustion engine, and the driving member 16b. The torque ripple causes the torque transmitting member 15 to repeat coupling and separation, and metal fatigue occurs in the coupling face. In the embodiment configured as described above, torque ripple is absorbed, so that the life period of the one-way clutch 13b can be prolonged. The place where the elastic member 47 is interposed is not particularly restricted as far as the place exists between the pulley 9 and the coupling face of the torque transmitting member 15. For example, the pulley 9 and the driving member 16b may be separated from each other and the elastic member may be interposed between them.

Embodiment 10

Figure 11:
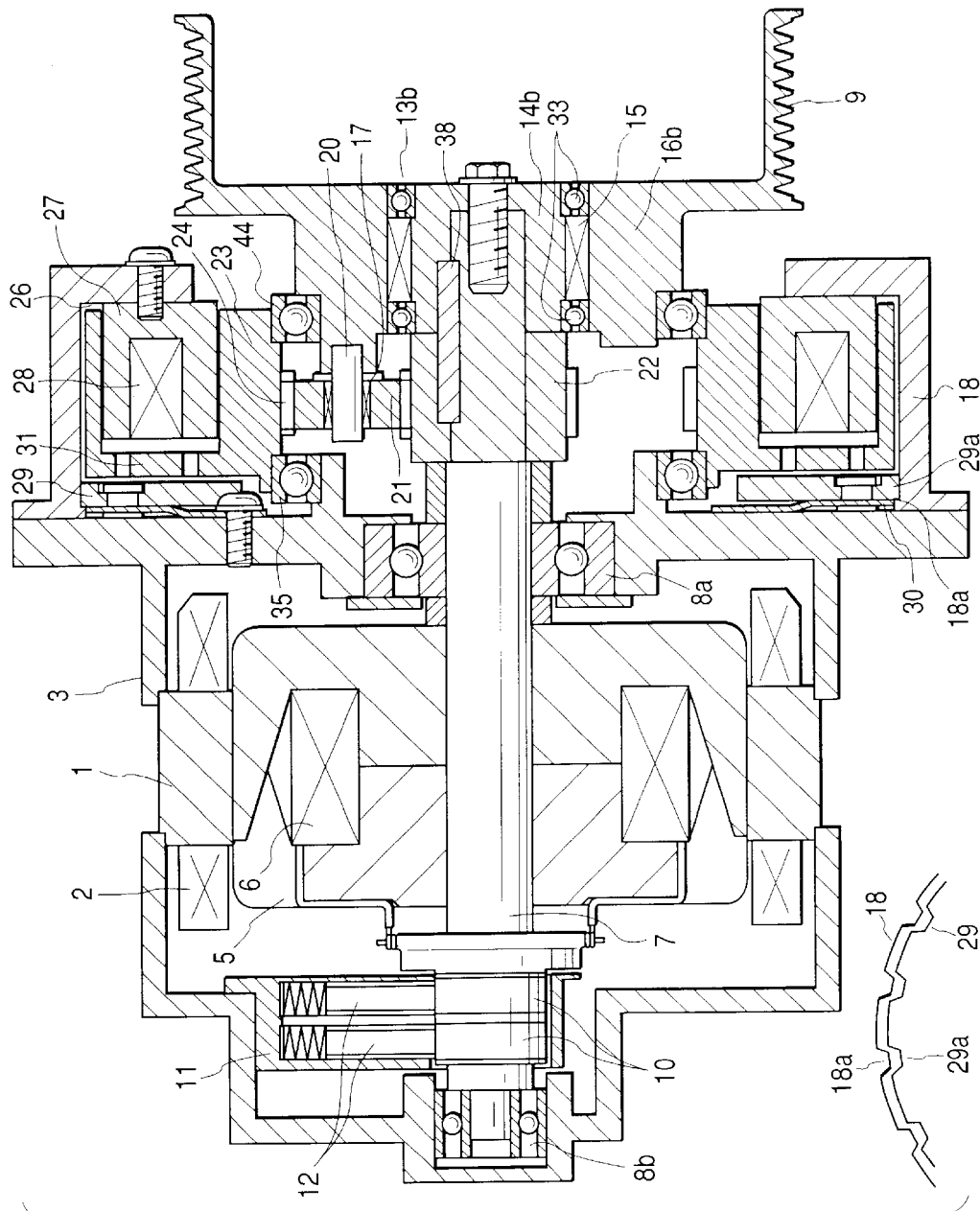
FIG. 11 is a section view of an automotive alternator of Embodiment 10 of the invention.
Figure 12:
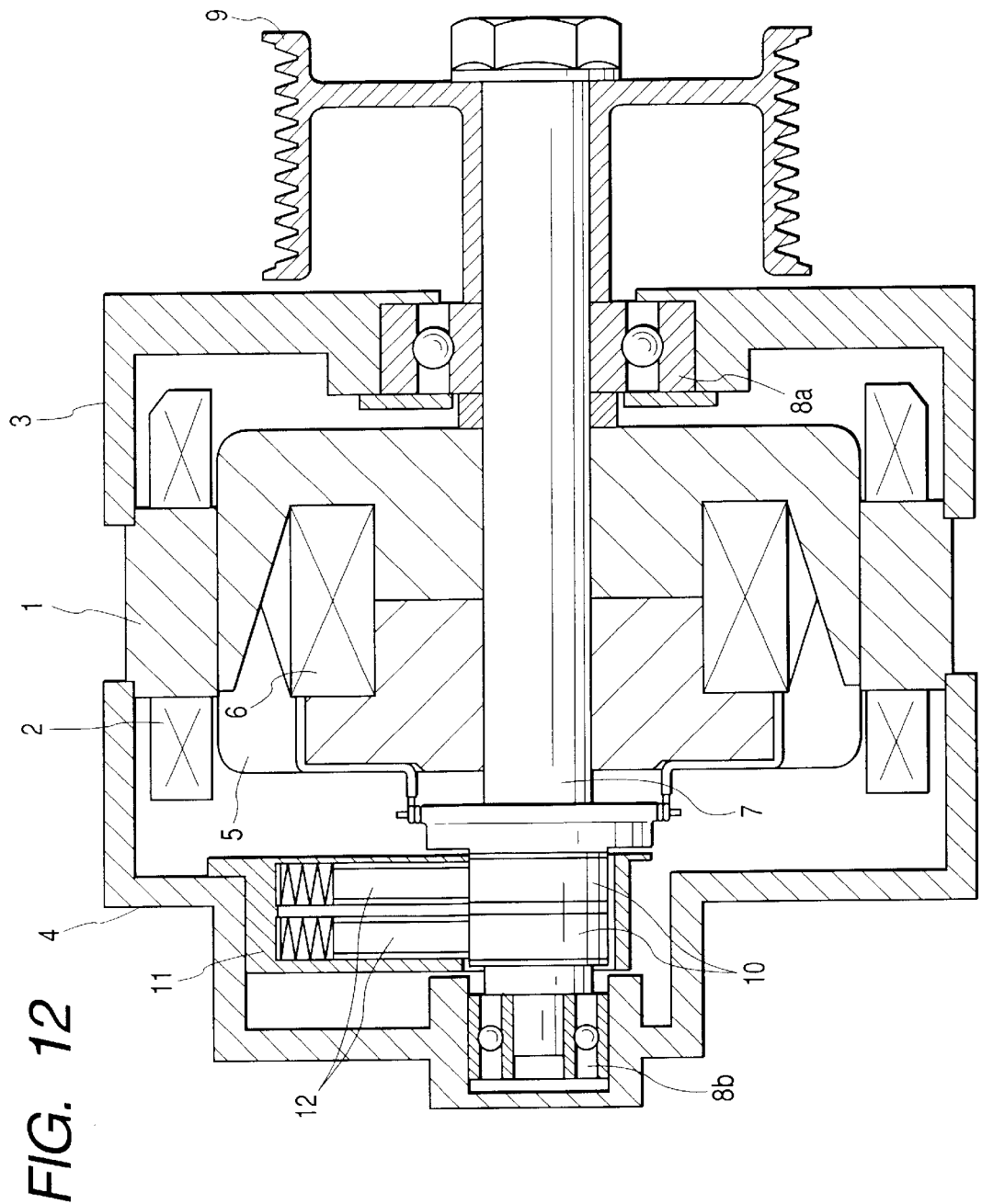
FIG. 12 is a section view of a conventional automotive alternator.
Figure 13:
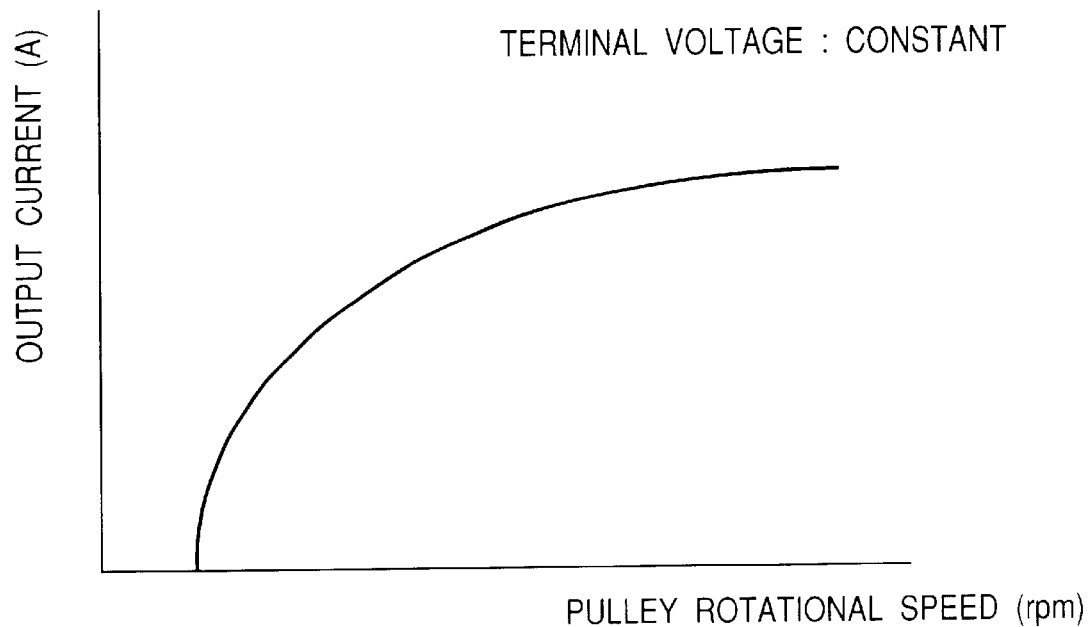
FIG. 13 is an output characteristic diagram of the conventional automotive alternator.

FIG. 11 is a section view of an automotive alternator of Embodiment 10 of the invention. The automotive alternator of the embodiment is configured by modifying the automotive alternators of Embodiments 1 to 9 in the following manner. Concave and convex guides 18a are axially disposed in the inner face of the housing 18 which accommodates the electromagnetic brake 26. Guide grooves 29a which are to be engaged with the guides 18a of the inner face of the housing 18 are disposed in the outer face of the moving element 29 of the electromagnetic brake 26. According to this configuration, during operation of the electromagnetic brake 26, the moving element 29 can smoothly move, and the guides and the guide grooves can be used for positioning in assembling.

As described above, according to the configuration of the automotive alternator of the first aspect of the invention, the overdrive planetary gear mechanism, the electromagnetic brake which turns on and off the overdrive function of the overdrive planetary gear mechanism, and the one-way clutch which causes slippage between the input shaft and the rotation shaft to occur during the overdrive function are disposed, and the speed of the rotor can be increased in the low rotational speed range including the idling range of an internal combustion engine. Therefore, the output in the low rotational speed range can be increased without enlarging the outer diameter of the alternator. According to the configuration of the second aspect of the invention, both the ends of the input shaft for driving the overdrive planetary gear mechanism are supported by using the support shaft of the planet gear and the holding member. Therefore, it is possible to prevent an offset load from being applied to the overdrive planetary gear mechanism and the one-way clutch. According to the configuration of the third aspect of the invention, the bearing for the one-way clutch is used also as the bearing for the overdrive planetary gear mechanism, and hence the number of parts can be reduced.

According to the configuration of the fourth aspect of the invention, it is possible to obtain an automotive alternator which, although the configuration is different from that of the first aspect of the invention, can attain the same effects as those of the first aspect of the invention, and in which the number of parts of the bearings can be reduced. According to the configuration of the fifth aspect of the invention, the holding member which is supported by the bearing is attached to the input shaft, and hence it is possible to prevent an offset load from being applied to the overdrive planetary gear mechanism and the one-way clutch, without sacrifice of the assembling property. According to the configuration of the sixth aspect of the invention, the one end of the input shaft is supported by the rotation shaft of the alternator. Therefore, the configuration has high rigidity, and partial wear and the like of the gears of the overdrive planetary gear mechanism can be reduced.

According to the configuration of the seventh aspect of the invention, the input shaft and the driving member of the one-way clutch are integrally configured, the support shaft of the planet gear is attached to the driving member, and the driven member of the one-way clutch is attached to the rotation shaft of the alternator. Therefore, it is possible to attain the same effects as those of the first aspect of the invention while the number of parts is reduced. According to the configuration of the eighth aspect of the invention, the one end portion of the member having the outer ring gear of the overdrive planetary gear mechanism is supported by the rotation shaft of the alternator, and hence the eccentricity with respect to the rotation shaft is reduced, so that partial wear and damage of the gears of the overdrive planetary gear mechanism can be reduced. According to the configuration of the ninth aspect of the invention, the outer diameter of the driving member which is configured integrally with the input shaft is supported by the bearing disposed on the housing. Therefore, excellent resistance against the bending moment applied to the pulley is exerted, and it is possible to prevent partial wear and damage of the gears of the overdrive planetary gear mechanism from occurring. According to the configuration of the tenth aspect of the invention, since the elastic member is interposed between the driving member of the one-way clutch and the input shaft, fatigue resistance against a torque ripple is improved.

According to the configuration of the eleventh aspect of the invention, the input shaft and the driving member of the one-way clutch are configured so as to be separable from each other. Therefore, the assembling property can be improved, and the interchangeability of the driving member with respect to input shafts respectively having pulleys of different diameters can be attained. According to the configuration of the twelfth aspect of the invention, the sun gear of the overdrive planetary gear mechanism, and the driven member of the one-way clutch are integrally formed, and hence the assembling property is excellent. According to the configuration of the thirteenth aspect of the invention, the sun gear of the overdrive planetary gear mechanism, and the driven member of the one-way clutch are separately configured, and hence the assembling property is excellent.

According to the configuration of the fourteenth aspect of the invention, one of the bearings which support the member having the outer ring gear is configure so as to bear radial and axial loads. Even when a load in the thrust direction is applied during operation of the electromagnetic brake, therefore, the bearing can bear the load. According to the configuration of the fifteenth aspect of the invention, guide grooves which mutually engage with each other are formed in the inner face of the housing of the electromagnetic brake, and the outer face of the moving element. Therefore, during operation of the electromagnetic brake, the moving element can smoothly move, and the guide grooves can be used for positioning in assembling. According to the configuration of the sixteenth aspect of the invention, the gap between the magnetic path of the electromagnetic brake, and the member which has the outer ring gear, and which is formed into a U-like section shape so as to surround the magnetic path is set to be larger as moving toward the opening of the U-like section shape. Even when the member having the outer ring gear is tilted during operation of the electromagnetic brake, therefore, mutual interference can be prevented from occurring. In this way, it is possible to obtain an excellent automotive alternator.

What is claimed is:

1. An automotive alternator comprising:
   a stator core having a stator winding;
   front and rear brackets which hold said stator core from both sides;
   a rotor core which is attached to a rotation shaft that is rotatably mounted on said brackets, and has a field winding;
   a one-way clutch which has a driving member and a driven member, said driven member being fixed to said rotation shaft;
   an overdrive planetary gear mechanism which has a sun gear, a planet gear, and an outer ring gear, said sun gear being fixed to said rotation shaft, one end of a support shaft of said planet gear being fixed to said driving member of said one-way clutch, said outer ring gear being rotatably supported;
   an input shaft to which another end of said support shaft of said planet gear of said overdrive planetary gear mechanism is fixed, and which receives a driving force from an internal combustion engine; and
   an electromagnetic brake which operates in response to energization to block rotation of said outer ring gear of said overdrive planetary gear mechanism,
   wherein said driving member and said input shaft are different components of said automotive alternator.

2. An automotive alternator according to claim 1, wherein said alternator has a housing which is attached to said front bracket, and which covers an axial end portion of said rotation shaft, one end of said input shaft is supported by a bearing disposed on said housing, and another end of said input shaft is supported by said rotation shaft via said support shaft of said planet gear and said one-way clutch.

3. An automotive alternator comprising:
   a stator core having a stator winding;
   front and rear brackets which hold said stator core from both sides;
   a rotor core which is attached to a rotation shaft that is rotatably mounted on said brackets, and has a field winding;
   a one-way clutch which has a driving member and a driven member, said driven member being fixed to said rotation shaft;
   an overdrive planetary gear mechanism which has a sun gear, a planet gear, and an outer ring gear, said sun gear being fixed to said rotation shaft, one end of a support shaft of said planet gear being fixed to said driving member of said one-way clutch, said outer ring gear being rotatably supported;
   an input shaft to which another end of said support shaft of said planet gear of said overdrive planetary gear mechanism is fixed, and which receives a driving force from an internal combustion engine; and
   an electromagnetic brake which operates in response to energization to block rotation of said outer ring gear of said overdrive planetary gear mechanism,
   wherein a bearing is disposed on an outer diameter of said driving member of said one-way clutch, one end of a cylindrical member having said outer ring gear of said overdrive planetary gear mechanism is supported by said bearing, and another end of said cylindrical member is supported by said bearing disposed on a housing.

4. An automotive alternator comprising:
   a stator core having a stator winding;
   front and rear brackets which hold said stator core from both sides;
   a rotor core which is attached to a rotation shaft that is rotatably mounted on said brackets and which has a field winding;
   an overdrive planetary gear mechanism which has a sun gear, a planet gear, and an outer ring gear, said sun gear being fixed to said rotation shaft, one end of a support shaft of said planet gear being fixed to a driving member of said one-way clutch, said outer ring gear being rotatably supported;
   an input shaft to which said support shaft of said planet gear of said overdrive planetary gear mechanism is fixed, and which receives a driving force from an internal combustion engine;
   a one-way clutch which has a driving member and a driven member, said driving member being fixed to said input shaft, said driven member being coupled with a member having said outer ring gear of said overdrive planetary gear mechanism; and
   an electromagnetic brake which operates in response to energization to block rotation of said outer ring gear of said overdrive planetary gear mechanism, wherein said driving member and said input shaft are different components of said automotive alternator.

5. An automotive alternator comprising:

a stator core having a stator winding;

front and rear brackets which hold said stator core from both sides;

a rotor core which is attached to a rotation shaft that is rotatably mounted on said brackets and which has a field winding;

an overdrive planetary gear mechanism which has a sun gear, a planet gear, and an outer ring gear, said sun gear being fixed to said rotation shaft, one end of a support shaft of said planet gear being fixed to a driving member of said one-way clutch, said outer ring gear being rotatably supported;

an input shaft to which said support shaft of said planet gear of said overdrive planetary gear mechanism is fixed, and which receives a driving force from an internal combustion engine;

a one-way clutch which has a driving member and a driven member, said driving member being fixed to said input shaft, said driven member being coupled with a member having said outer ring gear of said overdrive planetary gear mechanism; and an electromagnetic brake which operates in response to energization to block rotation of said outer ring gear of said overdrive planetary gear mechanism, wherein said alternator has a housing which is attached to said front bracket, and covers an axial end portion of said rotation shaft, one end of said input shaft is supported by a bearing disposed on said housing, via said one-way clutch, said alternator further has a support member which is elongated from another end of said input shaft, and said support member is supported by a bearing disposed on said front bracket.

6. An automotive alternator comprising:

a stator core having a stator winding;

front and rear brackets which hold said stator core from both sides;

a rotor core which is attached to a rotation shaft that is rotatably mounted on said brackets and which has a field winding;

an overdrive planetary gear mechanism which has a sun gear, a planet gear, and an outer ring gear, said sun gear being fixed to said rotation shaft, one end of a support shaft of said planet gear being fixed to a driving member of said one-way clutch, said outer ring gear being rotatably supported;

an input shaft to which said support shaft of said planet gear of said overdrive planetary gear mechanism is fixed, and which receives a driving force from an internal combustion engine;

a one-way clutch which has a driving member and a driven member, said driving member being fixed to said input shaft, said driven member being coupled with a member having said outer ring gear of said overdrive planetary gear mechanism; and an electromagnetic brake which operates in response to energization to block rotation of said outer ring gear of said overdrive planetary gear mechanism, wherein said alternator has a housing which is attached to said front bracket, and covers an axial end portion of said rotation shaft, one end of said input shaft is supported by a bearing disposed on said housing, via said one-way clutch, said alternator further has a support member which is elongated from another end of said input shaft, and said support member is supported by a bearing disposed on said rotation shaft.

7. An automotive alternator comprising:

a stator core having a stator winding;

front and rear brackets which hold said stator core from both sides;

a rotor core which is attached to a rotation shaft that is rotatably mounted on said brackets, and has a field winding;

a one-way clutch which has a driving member and a driven member, said driven member being fixed to said rotation shaft, said driving member being connected to an input shaft driven by an internal combustion engine;

an overdrive planetary gear mechanism which has a sun gear, a planet gear, and an outer ring gear, said sun gear being fixed to said rotation shaft, a support shaft of said planet gear being fixed to said driving member which is connected to said input shaft, said outer ring gear being rotatably supported; and an electromagnetic brake which operates in response to energization to block rotation of said outer ring gear of said overdrive planetary gear mechanism, wherein said driving member and said input shaft are different components of said automotive alternator.

8. An automotive alternator according to claim 7, wherein said alternator has a housing which is attached to said front bracket, and covers an axial end portion of said rotation shaft, and said driving member of said one-way clutch which is integrated with said input shaft is supported by a bearing disposed on said housing.

9. An automotive alternator according to claim 7, wherein said driving member of said one-way clutch is attached to said input shaft via an elastic member.

10. An automotive alternator according to claim 7, wherein said sun gear of said overdrive planetary gear mechanism which is fixed to said rotation shaft, and said driven member of said one-way clutch are integrally formed.

11. An automotive alternator according to claim 7, wherein said sun gear of said overdrive planetary gear mechanism which is fixed to said rotation shaft, and said driven member of said one-way clutch are separably formed.

12. An automotive alternator comprising:

a stator core having a stator winding;

front and rear brackets which hold said stator core from both sides;

a rotor core which is attached to a rotation shaft that is rotatably mounted on said brackets, and has a field winding;

a one-way clutch which has a driving member and a driven member, said driven member being fixed to said rotation shaft, said driving member being connected to an input shaft driven by an internal combustion engine;

an overdrive planetary gear mechanism which has a sun gear, a planet gear, and an outer ring gear, said sun gear being fixed to said rotation shaft, a support shaft of said planet gear being fixed to said driving member which is, connected to said input shaft, said outer ring gear being rotatably supported; and an electromagnetic brake which operates in response to energization to block rotation of said outer ring gear of said overdrive planetary gear mechanism, wherein one end portion of a member having said outer ring gear is supported by said rotation shaft via a bearing, and another end of said member is supported via a bearing by an outer diameter of said driving member which is integrated with said input shaft.

13. An automotive alternator comprising:

a stator core having a stator winding;

front and rear brackets which hold said stator core from both sides;

a rotor core which is attached to a rotation shaft that is rotatably mounted on said brackets, and has a field winding;

a one-way clutch which has a driving member and a driven member, said driven member being fixed to said rotation shaft, said driving member being connected to an input shaft driven by an internal combustion engine;

an overdrive planetary gear mechanism which has a sun gear, a planet gear, and an outer ring gear, said sun gear being fixed to said rotation shaft, a support shaft of said planet gear being fixed to said driving member which is connected to said input shaft, said outer ring gear being rotatably supported; and an electromagnetic brake which operates in response to energization to block rotation of said outer ring gear of said overdrive planetary gear mechanism, wherein said input shaft which is driven by said internal combustion engine is configured to be separable from said driving member of said one-way clutch.

14. An automotive alternator comprising:

a stator core having a stator winding;

front and rear brackets which hold said stator core from both sides;

a rotor core which is attached to a rotation shaft that is rotatably mounted on said brackets, and has a field winding;

a one-way clutch which has a driving member and a driven member, said driven member being fixed to said rotation shaft;

an overdrive planetary gear mechanism which has a sun gear, a planet gear, and an outer ring gear, said sun gear being fixed to said rotation shaft, one end of a support shaft of said planet gear being fixed to said driving member of said one-way clutch, said outer ring gear being rotatably supported;

an input shaft to which another end of said support shaft of said planet gear of said overdrive planetary gear mechanism is fixed, and which receives a driving force from an internal combustion engine; and an electromagnetic brake which operates in response to energization to block rotation of said outer ring gear of said overdrive planetary gear mechanism, wherein bearings which rotatably support a member having said outer ring gear are disposed respectively in two places in an axial direction, and at least one of said bearings bears radial and axial loads.

15. An automotive alternator comprising:

a stator core having a stator winding;

front and rear brackets which hold said stator core from both sides;

a rotor core which is attached to a rotation shaft that is rotatably mounted on said brackets, and has a field winding;

a one-way clutch which has a driving member and a driven member, said driven member being fixed to said rotation shaft;

an overdrive planetary gear mechanism which has a sun gear, a planet gear, and an outer ring gear, said sun gear being fixed to said rotation shaft, one end of a support shaft of said planet gear being fixed to said driving member of said one-way clutch, said outer ring gear being rotatably supported;

an input shaft to which another end of said support shaft of said planet gear of said overdrive planetary gear mechanism is fixed, and which receives a driving force from an internal combustion engine; and an electromagnetic brake which operates in response to energization to block rotation of said outer ring gear of said overdrive planetary gear mechanism, wherein said electromagnetic brake comprises an exciting coil which magnetizes a magnetic path; and a moving element which is attracted by magnetization of said magnetic path to block rotation of said outer ring gear of said overdrive planetary gear mechanism, said electromagnetic brake is accommodated in a housing, and guide grooves which mutually engage with each other are formed in an inner face of said housing, and an outer face of said moving element.

16. An automotive alternator comprising:

a stator core having a stator winding;

front and rear brackets which hold said stator core from both sides;

a rotor core which is attached to a rotation shaft that is rotatably mounted on said brackets, and has a field winding;

a one-way clutch which has a driving member and a driven member, said driven member being fixed to said rotation shaft;

an overdrive planetary gear mechanism which has a sun gear, a planet gear, and an outer ring gear, said sun gear being fixed to said rotation shaft, one end of a support shaft of said planet gear being fixed to said driving member of said one-way clutch, said outer ring gear being rotatably supported;

an input shaft to which another end of said support shaft of said planet gear of said overdrive planetary gear mechanism is fixed, and which receives a driving force from an internal combustion engine; and an electromagnetic brake which operates in response to energization to block rotation of said outer ring gear of said overdrive planetary gear mechanism, wherein a member having said outer ring gear is formed into a U-like section shape having a bottom face and two side faces, said bottom face is a face abutting against a moving element of said electromagnetic brake, said two side faces surround inner and outer peripheries of said electromagnetic brake, and a gap between inner faces of said two side faces and an outer face of a magnetic path is larger as moving toward an opening of said U-like section shape.

* * * * *